US006975962B2

(12) United States Patent
Wegerich et al.

(10) Patent No.: US 6,975,962 B2
(45) Date of Patent: Dec. 13, 2005

(54) RESIDUAL SIGNAL ALERT GENERATION FOR CONDITION MONITORING USING APPROXIMATED SPRT DISTRIBUTION

(75) Inventors: Stephan W. Wegerich, Glendale Heights, IL (US); Robert Matthew Pipke, Oak Park, IL (US)

(73) Assignee: SmartSignal Corporation, Lisle, IL (US)

( * ) Notice: Subject to any disclaimer, the term of this patent is extended or adjusted under 35 U.S.C. 154(b) by 0 days.

(21) Appl. No.: 10/165,119

(22) Filed: Jun. 7, 2002

(65) Prior Publication Data

US 2003/0055607 A1 Mar. 20, 2003

Related U.S. Application Data

(60) Provisional application No. 60/297,404, filed on Jun. 11, 2001.

(51) Int. Cl.[7] .......................... G06F 11/30; G06F 17/16
(52) U.S. Cl. ......................... 702/182; 702/179; 703/7
(58) Field of Search ........................ 702/33–36, 38–40, 702/57–59, 179–185; 700/29–31, 47, 51, 174; 703/7; 340/511, 3.1, 3.43

(56) References Cited

U.S. PATENT DOCUMENTS

| 3,045,221 A | 7/1961 | Roop |
| 4,060,716 A | 11/1977 | Pekrul et al. |
| 4,336,595 A | 6/1982 | Adams et al. |
| 4,402,054 A | 8/1983 | Osborne et al. |
| RE31,750 E | 11/1984 | Morrow |

(Continued)

FOREIGN PATENT DOCUMENTS

WO  WO 00/67412  11/2000

OTHER PUBLICATIONS

"MSET Modeling Of Crystal River-3 Venturi Flow Meters" by J. P. Herzog, S. W. Wegerich, K. C. Gross, and F. K. Bockhorst, 6th International Conference on Nuclear Engineering, ICONE-6169, May 10-14, 1998, Copyright ©1998 ASME (12 pp).

"Application Of A New Technique For Modeling System Behavior" by Paul J. O'Sullivan, presented at the ISA Symposium, Edmonton, Alberta, May 1, 1991, ©Copyright 1991 Instrument Society of America (21 pp).

"A Universal, Fault-Tolerant, Non-Linear Analytic Network For Modeling And Fault Detection," by J. E. Mott, R. W. King, L.R. Monson, D. L. Olson and J. D. Staffon, Proceedings of the 8th Power Plant Dynamics, Control & Testing Symposium, Knoxville, Tennessee, May 27–29, 1992 (14 pp).

ModelWare™ Product Review by Robert D. Flori, reprinted from Computerized Investing, Sep./Oct. 1992, vol. XI, No. 5, copyright by The American Association of Individual Investors (pp. 8–10).

(Continued)

*Primary Examiner*—Marc S. Hoff
*Assistant Examiner*—Manuel L. Barbee
(74) *Attorney, Agent, or Firm*—Fitch, Even, Tabin & Flannery

(57) ABSTRACT

A system and method for monitoring a condition of a monitored system. Estimates of monitored parameters from a model of the system provide residual values that can be analyzed using a sequential probability ratio test ("SPRT"). The invention employs empirically derived distributions in the SPRT to provide more accurate and sensitive alerts of impending faults, breakdowns and process deviations. The distributions can be generated from piecewise continuous approximation or spline functions based on the actual distribution of residual data to provide improved computational performance. The distributions can be provided before monitoring, or can be updated and determined during monitoring in an adaptive fashion.

37 Claims, 2 Drawing Sheets

U.S. PATENT DOCUMENTS

| | | | |
|---|---|---|---|
| 4,480,480 A | 11/1984 | Scott et al. | |
| 4,639,882 A | 1/1987 | Keats | |
| 4,707,796 A | 11/1987 | Calabro et al. | |
| 4,761,748 A | 8/1988 | Le Rat et al. | |
| 4,796,205 A | 1/1989 | Ishii et al. | |
| 4,823,290 A | 4/1989 | Fasack et al. | |
| 4,937,763 A | 6/1990 | Mott | |
| 4,965,513 A | 10/1990 | Haynes et al. | |
| 4,978,909 A | 12/1990 | Hendrix et al. | |
| 4,985,857 A | 1/1991 | Bajpai et al. | |
| 5,003,950 A | 4/1991 | Kato et al. | |
| 5,025,499 A | 6/1991 | Inoue et al. | |
| 5,052,630 A | 10/1991 | Hinsey et al. | |
| 5,093,792 A | 3/1992 | Taki et al. | |
| 5,113,483 A | 5/1992 | Keeler et al. | |
| 5,119,287 A | 6/1992 | Nakamura et al. | |
| 5,123,017 A | 6/1992 | Simpkins et al. | |
| 5,195,046 A | 3/1993 | Gerardi et al. | |
| 5,210,704 A | 5/1993 | Husseiny | |
| 5,223,207 A * | 6/1993 | Gross et al. | 376/216 |
| 5,251,285 A | 10/1993 | Inoue et al. | |
| 5,285,494 A | 2/1994 | Sprecher et al. | |
| 5,309,351 A | 5/1994 | McCain et al. | |
| 5,311,562 A | 5/1994 | Palusamy et al. | |
| 5,325,304 A | 6/1994 | Aoki | |
| 5,327,349 A | 7/1994 | Hoste | |
| 5,386,373 A | 1/1995 | Keeler et al. | |
| 5,410,492 A * | 4/1995 | Gross et al. | 702/185 |
| 5,414,632 A | 5/1995 | Mochizuki et al. | |
| 5,420,571 A | 5/1995 | Coleman et al. | |
| 5,421,204 A | 6/1995 | Svaty, Jr. | |
| 5,445,347 A | 8/1995 | Ng | |
| 5,446,671 A | 8/1995 | Weaver et al. | |
| 5,446,672 A | 8/1995 | Boldys | |
| 5,455,777 A | 10/1995 | Fujiyama et al. | |
| 5,459,675 A * | 10/1995 | Gross et al. | 702/183 |
| 5,481,647 A | 1/1996 | Brody et al. | |
| 5,486,997 A | 1/1996 | Reismiller et al. | |
| 5,495,168 A | 2/1996 | de Vries | |
| 5,496,450 A | 3/1996 | Blumenthal et al. | |
| 5,500,940 A | 3/1996 | Skeie | |
| 5,502,543 A | 3/1996 | Aboujaoude | |
| 5,539,638 A | 7/1996 | Keeler et al. | |
| 5,548,528 A | 8/1996 | Keeler et al. | |
| 5,553,239 A | 9/1996 | Heath et al. | |
| 5,559,710 A | 9/1996 | Shahraray et al. | |
| 5,566,092 A | 10/1996 | Wang et al. | |
| 5,579,232 A | 11/1996 | Tong et al. | |
| 5,586,066 A | 12/1996 | White et al. | |
| 5,596,507 A | 1/1997 | Jones et al. | |
| 5,600,726 A | 2/1997 | Morgan et al. | |
| 5,602,733 A | 2/1997 | Rogers et al. | |
| 5,608,845 A | 3/1997 | Ohtsuka et al. | |
| 5,612,886 A | 3/1997 | Weng | |
| 5,617,342 A | 4/1997 | Elazouni | |
| 5,623,109 A | 4/1997 | Uchida et al. | |
| 5,629,878 A | 5/1997 | Kobrosly | |
| 5,638,413 A | 6/1997 | Uematsu et al. | |
| 5,657,245 A | 8/1997 | Hecht et al. | |
| 5,663,894 A | 9/1997 | Seth et al. | |
| 5,668,944 A | 9/1997 | Berry | |
| 5,671,635 A | 9/1997 | Nadeau et al. | |
| 5,680,409 A | 10/1997 | Qin et al. | |
| 5,680,541 A | 10/1997 | Kurosu et al. | |
| 5,682,317 A | 10/1997 | Keeler et al. | |
| 5,708,780 A | 1/1998 | Levergood et al. | |
| 5,710,723 A | 1/1998 | Hoth et al. | |
| 5,727,144 A | 3/1998 | Brady et al. | |
| 5,737,228 A | 4/1998 | Ishizuka et al. | |
| 5,748,469 A | 5/1998 | Pyötsiä | |
| 5,748,496 A | 5/1998 | Takahashi et al. | |
| 5,751,580 A | 5/1998 | Chi | |
| 5,754,451 A | 5/1998 | Williams | |
| 5,757,309 A | 5/1998 | Brooks et al. | |
| 5,761,090 A | 6/1998 | Gross et al. | |
| 5,764,509 A * | 6/1998 | Gross et al. | 700/29 |
| 5,774,379 A * | 6/1998 | Gross et al. | 702/72 |
| 5,784,285 A | 7/1998 | Tamaki et al. | |
| 5,787,138 A | 7/1998 | Ocieczek et al. | |
| 5,817,958 A | 10/1998 | Uchida et al. | |
| 5,818,716 A | 10/1998 | Chin et al. | |
| 5,822,212 A | 10/1998 | Tanaka et al. | |
| 5,841,677 A | 11/1998 | Yang et al. | |
| 5,842,157 A | 11/1998 | Wehhofer et al. | |
| 5,864,773 A | 1/1999 | Barna et al. | |
| 5,886,913 A | 3/1999 | Marguinaud et al. | |
| 5,895,177 A | 4/1999 | Iwai et al. | |
| 5,905,989 A | 5/1999 | Biggs | |
| 5,909,368 A | 6/1999 | Nixon et al. | |
| 5,913,911 A | 6/1999 | Beck et al. | |
| 5,930,156 A | 7/1999 | Kennedy | |
| 5,930,779 A | 7/1999 | Knoblock et al. | |
| 5,933,352 A | 8/1999 | Salut | |
| 5,933,818 A | 8/1999 | Kasravi et al. | |
| 5,940,298 A | 8/1999 | Pan et al. | |
| 5,946,661 A | 8/1999 | Rothschild et al. | |
| 5,946,662 A | 8/1999 | Ettl et al. | |
| 5,950,147 A | 9/1999 | Sarangapani et al. | |
| 5,956,487 A | 9/1999 | Venkatraman et al. | |
| 5,961,560 A | 10/1999 | Kemner | |
| 5,987,399 A * | 11/1999 | Wegerich et al. | 702/183 |
| 5,993,041 A | 11/1999 | Toba | |
| 6,006,192 A | 12/1999 | Cheng et al. | |
| 6,006,260 A | 12/1999 | Barrick, Jr. et al. | |
| 6,021,396 A | 2/2000 | Ramaswamy et al. | |
| 6,029,097 A | 2/2000 | Branicky et al. | |
| 6,049,741 A | 4/2000 | Kawamura | |
| 6,049,827 A | 4/2000 | Sugauchi et al. | |
| 6,076,088 A | 6/2000 | Paik et al. | |
| 6,088,626 A | 7/2000 | Lilly et al. | |
| 6,104,965 A | 8/2000 | Lim et al. | |
| 6,110,214 A | 8/2000 | Klimasauskas | |
| 6,115,653 A | 9/2000 | Bergström et al. | |
| 6,125,351 A | 9/2000 | Kauffman | |
| 6,128,540 A | 10/2000 | Van Der Vegt et al. | |
| 6,128,543 A | 10/2000 | Hitchner | |
| 6,141,647 A | 10/2000 | Meijer et al. | |
| 6,144,893 A | 11/2000 | Van Der Vegt et al. | |
| 6,182,022 B1 * | 1/2001 | Mayle et al. | 702/182 |
| 6,587,737 B2 * | 7/2003 | Voser et al. | 700/30 |
| 6,609,036 B1 * | 8/2003 | Bickford | 700/30 |
| 2002/0055826 A1 * | 5/2002 | Wegerich et al. | 703/2 |
| 2003/0125248 A1 * | 7/2003 | Hair et al. | 514/12 |
| 2003/0126258 A1 * | 7/2003 | Conkright et al. | 709/224 |

OTHER PUBLICATIONS

ModelWare™A New Approach to Prediction by Ken Tucker, reprinted from PC AI magazine, Jan./Feb. 1993, pp. 14, 15, 30.

"Similiarity Based Regression: Applied Advanced Pattern Recognition to Power Plant Analysis," by E. J. Hansen and M. B. Caudill, presented at the 1994 EPRI Heat Rate Improvement Conference (9 pp).

"Applied Pattern Recognition For Plant Monitoring And Data Validation," by Ron Griebenow, E. J. Hansen, and A. L. Sudduth, presented at the Fifth International Joint ISA POWID/EPRI Controls and Instrumentation Conference, La Jolla, California, Jun. 19–21, 1995 (11 pp).

"A Fault–Tolerant Sensory Diagnostic System For Intelligent Vehicle Application" by Ralph M. Singer, Kenny C. Gross, and Stephan Wegerich, presented at the IEEE International Symposium on Intelligent Vehicles, Detroit, Michigan, Sep. 25–26, 1997(7 pp.).

"Model–Based Nuclear Power Plant Monitoring And Fault Detection: Theoretical Foundations," by Ralph M. Singer, Kenny C. Gross, James P. Herzog, Ronald W. King, and Stephan Wegerich, presented at the International Conference on Intelligent System Application to Power System (ISAP '97), Jul. 6–10, 1997, Seoul, Korea (pp. 60–65).

"Application Of A Model–Based Fault Detection System To Nuclear Plant Signals," K. C. Gross, R. M. Singer, S. W. Wegerich, J. P. Herzog, R. VanAlstine, and F. Bockhorst, presented at the International Conference on Intelligent System Application to Power Systems (ISAP '97), Jul. 6–10, 1997, Seoul, Korea (pp. 66–70).

"Dynamics Sensor Validation For Reusable Launch Vehicle Propulsion" by J. P. Herzog, Y. Yue, and R. L. Bickford, AIAA 98–3604, presented at the 34th AIAA/ASME/SAE/ASEE Joint Propulsion Conference & Exhibit, Jul. 13–15, 1998, Cleveland, Ohio/20.

"Sequential Probability Ratio Tests for Reactor Signal Validation and Sensor Surveillance Applications" by K. Humenik and K. C. Gross, Nuclear Science and Engineering, vol. 105, Aug. 1990, pp. 383–390.

"Sequential Probability Ration Test for Nuclear Plant Component Surveillance" by K. C. Gross and K. E. Humenik, Nuclear Technology, vol. 93, Feb. 1991, pp. 131–137.

"Using Fourier Series Methods to Reduce Correlation of Nuclear Power Reactor Data" by K. Humenik and K. C. Gross, Nuclear Science and Engineering, vol. 112, Oct. 1992, pp. 127–135.

* cited by examiner

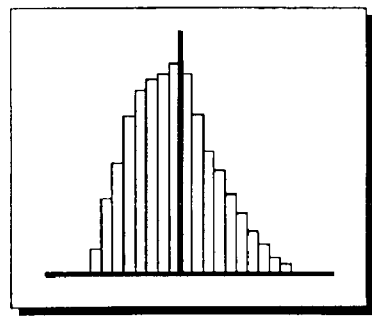
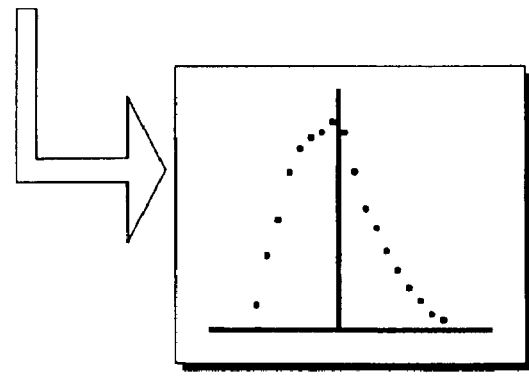
*Fig. 2*
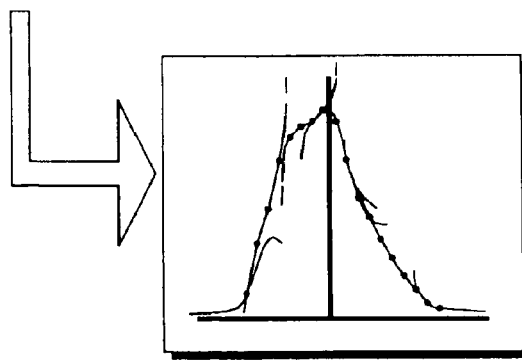
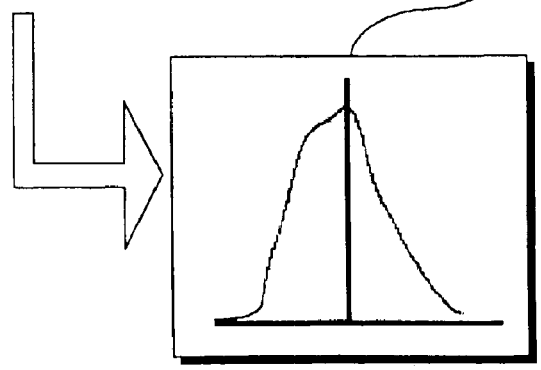

RESIDUAL SIGNAL ALERT GENERATION FOR CONDITION MONITORING USING APPROXIMATED SPRT DISTRIBUTION

CROSS-REFERENCE TO RELATED APPLICATION

This application claims benefit of U.S. Provisional Application No. 60/297,404, filed Jun. 11, 2001.

BACKGROUND OF THE INVENTION

1. Field of the Invention

The present invention relates generally to the field of early detection and diagnosis of incipient machine failure or process upset. More particularly, the invention is directed to generating appropriate alerts on the basis of residual signals indicative of system behavior.

2. Brief Description of the Related Art

A variety of new and advanced techniques have emerged in industrial process control, machine control, system surveillance, and condition based monitoring to address drawbacks of traditional sensor-threshold-based control and alarms. The traditional techniques did little more than provide responses to gross changes in individual metrics of a process or machine, often failing to provide adequate warning to prevent unexpected shutdowns, equipment damage, loss of product quality or catastrophic safety hazards.

According to one branch of the new techniques, empirical models of the monitored process or machine are used in failure detection and in control. Such models effectively leverage an aggregate view of surveillance sensor data to achieve much earlier incipient failure detection and finer process control. By modeling the many sensors on a process or machine simultaneously and in view of one another, the surveillance system can provide more information about how each sensor (and its measured parameter) ought to behave. Additionally, these approaches have the advantage that no additional instrumentation is typically needed, and sensors in place on the process or machine can be used.

An example of such an empirical surveillance system is described in U.S. Pat. No. 5,764,509 to Gross et al., the teachings of which are incorporated herein by reference. Therein is described an empirical model using a similarity operator against a reference library of known states of the monitored process, and an estimation engine for generating estimates of current process states based on the similarity operation, coupled with a sensitive statistical hypothesis test to determine if the current process state is a normal or abnormal state. The role of the similarity operator in the above empirical surveillance system is to determine a metric of the similarity of a current set of sensor readings to any of the snapshots of sensor readings contained in the reference library. The similarity metric thusly rendered is used to generate an estimate of what the sensor readings ought to be, from a weighted composite of the reference library snapshots. The estimate can then be compared to the current readings for monitoring differences indicating incipient process upset, sensor failure or the like.

Early detection of sensor failure, process upset or machine fault are afforded in such monitoring systems by sensitive statistical tests such as the sequential probability ratio test, also described in the aforementioned patent to Gross et al. The result of such a test when applied to the residual of the difference of the actual sensor signal and estimated sensor signal, is a decision as to whether the actual and estimate signals are the same or different, with user-selectable statistical confidence.

Successful application of the sequential probability ratio test to the empirical model-generated residuals of the above systems is contingent on several assumptions regarding those residuals. First, it is assumed that if the monitored system is behaving correctly, then the only differences between the actual sensor value and the estimated value are a function of noise. For empirical models that generate estimates, this is often a function of the quality of the data that was available to train the model. Second, it is assumed that this noise is both identically distributed and Gaussian, as well as temporally independent. Unfortunately, this is not always the case in many applications of the empirical monitoring systems mentioned above.

Because of these issues, an implementation of an empirical model according to a similarity operator, coupled to a SPRT alert generation module can result in nuisance alerts, especially if the model is set up with limited training data for the eventual expected range of operation of the process or machine being monitored. It is desirable to have alternative mechanisms for generating alerts on the basis of the comparison of the actual raw sensor data to the sensor data estimated by the similarity operator empirical model.

SUMMARY OF THE INVENTION

The present invention provides for early and accurate incipient fault detection for machines and processes. Sensors on the machine or process provide values descriptive of operation. A computational model of the machine or process generates estimates of sensor values in response to receiving actual sensor values from the sensors on the machine or process being monitored. The estimated sensor values generated by the model are subtracted from the actual sensor values to provide residual signals for sensors on the machine or process. When everything is working normally, as modeled by the model, the residual signals have approximately a zero mean, with variations due to noise and model discrepancies. When the process or machine deviates from any recognized and modeled state of operation, that is, when its operation becomes abnormal, these residuals become non-zero.

A sensitive statistical test is applied to each residual, in the form of a modified sequential probability ratio test (SPRT). This test provides the earliest possible decision in a sequence of observations in time whether the residual values are in the expected distribution for normal operation or not, often at such an early stage that the residual trend out of that distribution is still buried in the noise level. For any sensor where a decision is made that the residual is not in the expected distribution for normal operation, an alert is generated on that sensor for the time snapshot in question.

According to the invention, the modified SPRT utilizes an empirically derived distribution specific for each residual. Test operational data for the monitored system is differenced with estimates thereof from the model to generate test residuals, from which an empirical distribution is derived. Residual values can be organized in a histogram, which is then normalized to provide an approximate distribution shape. The normalized histogram data can be used to approximate the probability distribution, or more preferably the curve defining that shape can be approximated with piece-wise function fitting, such as splining techniques to provide an actual empirical distribution for use with SPRT.

The inventive system can comprise software running on a computer, with a memory for storing model information and the empirical distribution data. Furthermore, it has data acquisition means for receiving data from sensors on the process or machine being monitored. Typically, the system can be connected to or integrated into a process control system in an industrial setting and acquire data from that system over a network connection. No new sensors need to be installed in order to use the inventive system. The outputs of the software can be displayed, or transmitted to a pager, fax or other remote device, or output to a control system that may be disposed to act on the alerts for automatic process or machine control. Alternatively, due to the small computing requirements of the present invention, the inventive system can be reduced to an instruction set on a memory chip resident with a processor and additional memory for storing the model and library, and located physically on the process or equipment monitored, such as an automobile or aircraft.

BRIEF DESCRIPTION OF THE DRAWINGS

The novel features believed characteristic of the invention are set forth in the appended claims. The invention itself, however, as well as the preferred mode of use, further objectives and advantages thereof, is best understood by reference to the following detailed description of the embodiments in conjunction with the accompanying drawings, wherein:

FIG. 2 shows a process for generating an empirical SPRT distribution for a sensor for use in monitoring according to the invention.

DETAILED DESCRIPTION OF THE PREFERRED EMBODIMENTS

Figure 1:
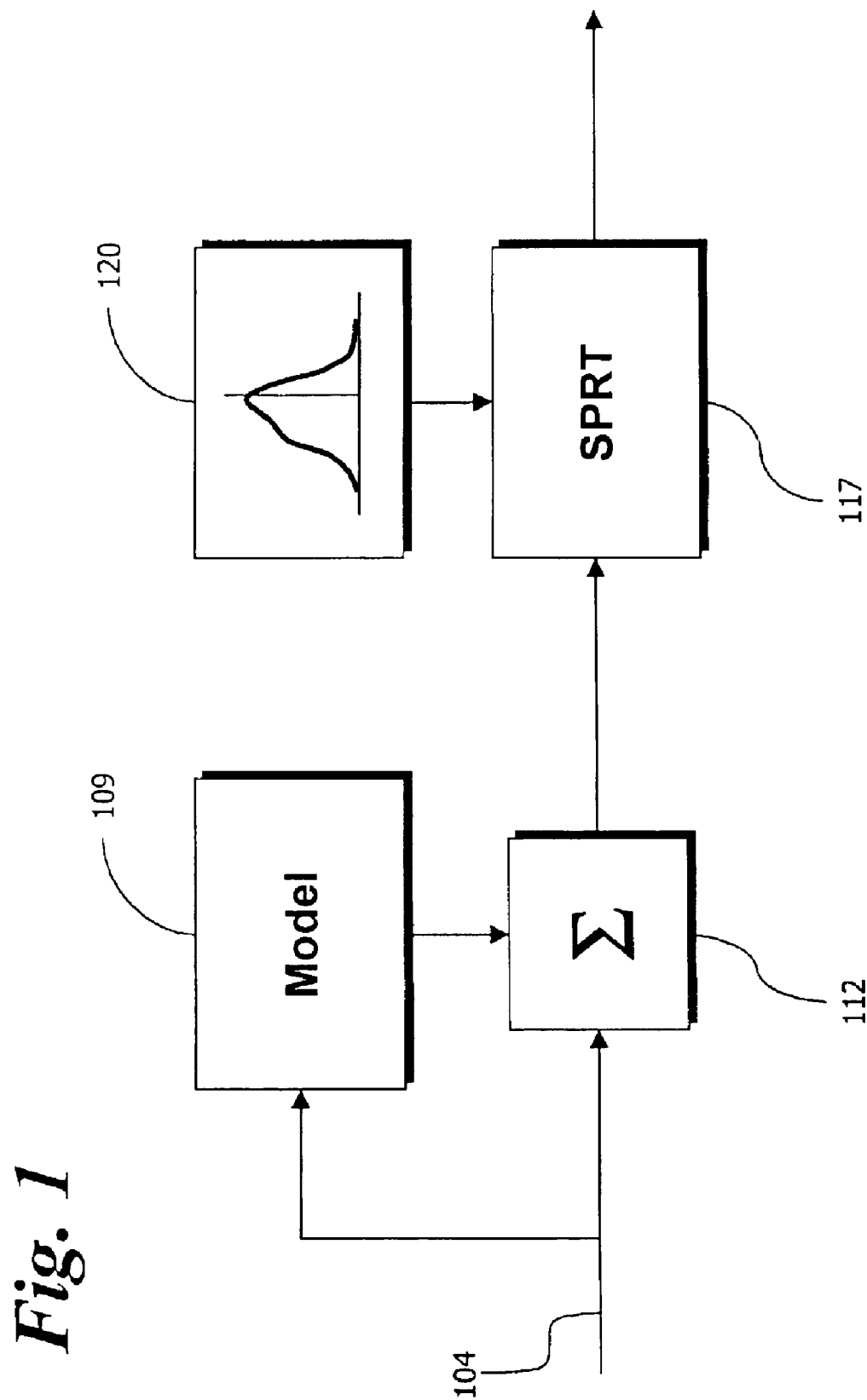
FIG. 1 shows a general arrangement for alert generation in a monitored system using empirical SPRT distributions according to the invention.

Improved monitoring for incipient faults in the operation of a machine or process instrumented with sensors is provided by the present invention as shown in FIG. 1. Therein, sensor data from at least one sensor is provided via an input 104 to a model 109, which models the expected operation of the monitored machine or process, and generates estimates for the sensor data. The estimates from the model 109 and the actual sensor data from 104 are differenced in an adder 112, to generate a residual signal for the sensor. A SPRT module 117 performs a sequential probability ratio test on successive values of the residual, employing an empirical residual distribution stored in a memory 120, that is specific to the sensor signal being processed. The SPRT module 117 generates alerts if the residual signal shows reliable statistical indication of no longer being a member of the empirical residual distribution.

Typically, many sensor signals are monitored and modeled together, and a number of different modeling techniques can be used in the present invention as model 109. Each sensor estimate from the model 109 is differenced with its matching actual sensor, and the SPRT module 117 performs a test on each residual independently, to provide alerts on a sensor-by-sensor basis. Further, the empirical residual distribution employed for each sensor is preferably different and specific to the sensor. Furthermore, the dynamic expected range for a sensor can be segmented into subranges, each of which has a specific empirically derived distribution for a sensor.

The usual sequential probability ratio test (SPRT) is described in the aforementioned U.S. Pat. No. 5,764,509 to Gross et al., and is known in the art from the theory of Wald and Wolfowitz, "Optimum Character of the Sequential Probability Ratio Test", Ann. Math. Stat. 19, 326 (1948). It is known to employ the SPRT with a residual as described in Gross et al. Broadly, for a sequence of estimates for a particular sensor, the test is capable of deciding with preselected missed and false alarm rates whether the estimates and actuals are statistically the same or different, that is, belong to the same or to two different probability distributions.

The basic approach of the SPRT technique is to analyze successive observations of a sampled parameter. A sequence of sampled differences between the estimate and the actual for a monitored parameter should be distributed according to some kind of distribution function around a mean of zero. Typically, in the art this is assumed to be a Gaussian distribution. Then, with each observation, a test statistic is calculated and compared to one or more decision limits or thresholds. The SPRT test statistic generally is the likelihood ratio $1_n$, which is the ratio of the probability that a hypothesis $H_1$ is true to the probability that a hypothesis $H_0$ is true:

$$l_n = \frac{(y_1, y_2, \ldots, y_n | H_1)}{(y_1, y_2, \ldots, y_n | H_0)} \tag{1}$$

where $Y_n$ are the individual observations and $H_n$ are the probability distributions for those hypotheses. This general SPRT test ratio can be compared to a decision threshold to reach a decision with any observation. For example, if the outcome is greater than 0.80, then decide $H_1$ is the case, if less than 0.20 then decide $H_0$ is the case, and if in between then make no decision.

The SPRT test can be applied to various statistical measures of the respective distributions. Thus, for a Gaussian distribution according to the prior art, a first SPRT test can be applied to the mean and a second SPRT test can be applied to the variance. For example, there can be a positive mean test and a negative mean test for data such as residuals that should distribute around zero. The positive mean test involves the ratio of the likelihood that a sequence of values belongs to a distribution $H_0$ around zero, versus belonging to a distribution $H_1$ around a positive value, typically the one standard deviation above zero. The negative mean test is similar, except $H_1$ is around zero minus one standard deviation. Furthermore, the variance SPRT test can be to test whether the sequence of values belongs to a first distribution $H_0$ having a known variance, or a second distribution $H_2$ having a variance equal to a multiple of the known variance.

As taught in Gross et al., the SPRT test can be simplified by assuming a Gaussian distribution:

$$p = \frac{1}{\sigma\sqrt{2\pi}} e^{\left[-\frac{(x-\mu)^2}{2\sigma^2}\right]} \tag{2}$$

where p is the probability of value x for a mean of $\mu$ and a variance of $\sigma$. Therefore, the calculation of the likelihood that $H_0$ is true for a residual (mean is zero and variance is $\sigma^2$ determined from residual data under normal operation of the monitored machine or process) simplifies to:

$$L(y_1, y_2, \ldots, y_n | H_0) = \frac{1}{(2\pi\sigma)^{n/2}} e^{\left[-\frac{1}{2\sigma^2}\sum_{k=1}^n y_k^2\right]} \tag{3}$$

and similarly, for $H_1$, where the mean is M (typically one standard deviation below or above zero, using the variance determined for the residuals from normal operation) and the variance is again $\sigma^2$ (variance is assumed the same):

$$L(y_1, y_2, \ldots, y_n \mid H_1) = \frac{1}{(2\pi\sigma)^{n/2}} e^{\left[-\frac{1}{2\sigma^2}(\sum_{k=1}^n y_k^2 - 2\sum_{k=1}^n y_k M + \sum_{k=1}^n M^2)\right]} \quad (4)$$

For an assumed Gaussian distribution, then, the ratio $l_n$ from equations 3 and 4 then becomes:

$$l_n = e^{\left[-\frac{1}{2\sigma^2}\sum_{k=1}^n M(M-2y_k)\right]} \quad (5)$$

A SPRT statistic can be defined for the mean test to be the exponent in equation 5:

$$SPRT_{mean} = -\frac{1}{2\sigma^2} \sum_{k=1}^n M(M - 2y_k) \quad (6)$$

The SPRT test is advantageous because a user-selectable false alarm probability $\alpha$ and a missed alarm probability $\beta$ can provide thresholds against which $SPRT_{mean}$ can be tested to produce a decision:

1. If $SPRT_{mean} \leq \ln(\beta/(1-\alpha))$, then accept hypothesis $H_0$ as true;
2. If $SPRT_{mean} \geq \ln((1-\beta)/\alpha)$, then accept hypothesis H1 as true; and
3. If $\ln(\beta/(1-\alpha)) < SPRT_{mean} < \ln((1-\beta)/\alpha)$, then make no decision and continue sampling.

While the above reduced equations present the SPRT test for the assumption of a Gaussian distribution for the residual around a mean of zero, as a practical matter, this may not be accurate for many monitored physical systems. Depending on the model used to produce the estimates for the operation of the monitored system, the variation on the residual signal may be quite non-Gaussian in distribution. By applying the Gaussian distribution to such data, the reliability, accuracy and statistical basis of early warnings of impending faults in the monitored system is negatively impacted, resulting in delays in alerting or premature or false alerts. This is further compounded by the fact that noise on the sensor's actual signal may also not exhibit a Gaussian distribution.

According to the invention, an empirically derived probability distribution is used to provide the successive likelihood values for successive residual data points in equation 1. The likelihood of a residual data point being part of that distribution is preferably compared in each iteration to the likelihood that the residual data point belongs to an identically shaped distribution offset from the first distribution by a selected positive or negative amount, typically a standard deviation or some multiple thereof.

Turning to FIG. 2, one embodiment of a procedure for deriving the empirical distribution is shown. Prior to performing this depicted procedure, it is assumed a model has been developed of the monitored machine or process for generating estimates for one or more instrumented parameters of interest. The model estimates and actual sensor data are differenced to produce residual data, for normal or desirable operation of the monitored machine or process. Accordingly, the residual values for test data for normal or desirable operation are organized in a histogram 205 of selectable granularity. Preferably, the size of each bin in the histogram is sufficient to confidently provide a reasonably accurate shape for the distribution. However, an advantage of the invention is that if a minimal number of test data are available to generate the histogram, it may nonetheless still be employed to derive the empirical distribution. Histogram 205 is preferably normalized at this stage, such that the total area of the bars sums to one, however this normalization may alternatively be done at the end of the derivation of the fitted curves that define the distribution. Histogram 205 provides data points in chart 220, each of which are preferably the height of each bin at its x-axis midpoint, or alternatively at the start or end of each bin width. In step 235, the data points of 220 are used in piece-wise curve fitting techniques to generate functions for each piece, preferably having at least first-derivative continuity and preferably also second-derivative continuity across the boundary between pieces. However, as an alternative, pieces with no derivative continuity across the boundary can be provided, such as simple line segments. The functions determined in 235 are then stored in memory for use in real-time monitoring as the set of functions 252, one for each piece of the segmented distribution.

A number of techniques are known for fitting functions to data over a segment of a distribution. According to one technique known in the art called splines, the range of the distribution is segmented into sections, each approximated by a polynomial of low degree. According to the invention, in its simplest form, a series $s_i(x)$ of straight lines can be used to approximate the overall distribution:

$$s_i(x) = a_i(x-x_i) + b_i; \quad x_i \leq x \leq x_{i+1} \quad (7)$$

According to the preferred embodiment of the invention, a cubic spline is used to approximate the distribution. In a cubic spline, the approximating function comprises (n−1) cubic polynomials for a histogram 205 having n bins. Furthermore, the functions at the boundaries at the data points of 220 are continuous in both the first and second derivatives. The functions are given by:

$$s_i(x) = f_i + s_i'(x_i)(x - x_i) + \frac{s_i''}{2}(x - x_i)^2 + \frac{s_{i+1}'' - s_i''}{6(x_{i+1} - x_i)}(x - x_i)^3 \quad (8)$$

for $i=1, 2, \ldots, n-1$ and $x_i \leq x \leq x_{i+1}$. Furthermore, they must satisfy the system of equations:

$$s_i''(x_{i+1} - x_i) + 2s_{i+1}''(x_{i+2} - x_i) + s_{i+2}''(x_{i+2} - x_{i+1}) = \quad (9)$$
$$6\left(\frac{f_{i+2} - f_{i+1}}{x_{i+2} - x_{i+1}} - \frac{f_{i+1} - f_i}{x_{i+1} - x_i}\right);$$
$$i = 1, 2, \ldots, n-2$$

with additional requirements:

$$s_1'' = s_n'' = 0 \text{ (Natural Spline)} \quad (10)$$

or alternatively:

$$\begin{cases} -\frac{(x_2 - x_1)}{3}s_1'' - \frac{(x_2 - x_1)}{6}s_2'' = \frac{f_1 - f_2}{x_2 - x_1} + f'(x_1), \\ \frac{(x_n - x_{n-1})}{6}s_{n-1}'' + \frac{(x_n - x_{n-1})}{3}s_n'' = \frac{f_{n-1} - f_n}{x_n - x_{n-1}} + f'(x_n) \end{cases} \quad (11)$$

("correct" boundary conditions).

Other splining techniques are well known in the art and can be employed in the present invention to derive an empirical distribution appropriate the each sensor.

According to an alternative embodiment of the invention, the histogram of the residual data can itself be used to provide the empirical distribution for the SPRT. In this case, the distribution essentially comprises a series of step functions for each of the bins of the histogram, having a dependent value equal to the normalized height of each bar in the histogram. In monitoring mode, a monitored residual falls into one of the bins, and the dependent value of the bin is used in the SPRT calculation for that observation.

The empirical distribution used for the SPRT according to the invention can be derived prior to initiating live monitoring, using test data embodying normal operation; or can be continually re-derived on-the-fly while monitoring, using residual data over windows of observations in which alerting either does not occur, or does not breach a threshold of frequency, either on the sensor individually or across the set of multiple sensors on the system being monitored. In deriving the distribution prior to monitoring, a first set of empirical data characteristic of normal operation is used to create the model, as for example described below with respect to a model using a similarity engine. Then a second set of empirical data, also characterizing normal operation, is run through the model and residuals are generated to provide data for the empirical histogram for the sensor or sensors being monitored with SPRT. Optionally, the normal operation of the monitored system can be differentiated into multiple operational states, in each of which the empirical distribution employed for a given sensor is different from the empirical distributions for that sensor in the other states. Thus, for example, an aircraft turbine can be considered to have at least the two operational states of take-off and cruise. Test data for normal take-off and cruise operation can be applied to a model (or two models, if modeled separately) for the turbine, to generate residuals for the monitored sensors. Residuals for take-off and cruise and then used to generate empirical distributions for the sensors for take-off and cruise modes, respectively. Only the relevant distribution is then used at run-time, depending on the state of operation of the turbine.

In the event that the empirical distributions for sensors are maintained on-the-fly while monitoring, a moving window can be employed. In this aspect of the invention, an initial SPRT distribution must be provided, which can either be a distribution empirically derived from test data prior to entering monitoring mode, as described above, or can be a standard distribution from the art, like a Gaussian distribution. Then, during monitoring using the provided distribution, SPRT alerts may or may not be generated, depending on the operational state of the monitored system. A window of observations can be stored in memory, including the residual value and time stamp of each observation for each sensor for which empirical distributions are desirably maintained. The window is preferably large enough to provide a good statistically meaningful amount of residual data to populate a distribution histogram. Depending on the application, this may be typically in the range of fifty to a thousand observations. If the window of observations has no alerts or has a number of alerts that is less than an acceptable threshold, then the window of residual data can be used to generate a new empirical distribution for the SPRT for that sensor. If a threshold is used against the number of alerts generated, it is preferably less than 5% of the observations in the window. Furthermore, it may be alerts on the sensor for which the distribution is being generated, or more preferably, it can be any alerts generated for any sensors monitored. In an empirical distribution was provided at the start of monitoring, and the goal is to update the distribution, the residual data from the window can be added to an existing library of residual data that provided an original distribution, to further refine the shape of the distribution.

The distribution can then be derived as described above with respect to FIG. 2. Alternatively, residual data from a moving window can supplement an original set of residual data to provide a constantly updated empirical distribution, by removing from the histogram residual data that is oldest on a first-in-first-out basis. Such an approach, however, may run the risk of incorporating a slowly developing fault into the distribution, and thus fail to alert on it over time. On the other hand, if a slowly developing fault is not a critical issue, this approach accommodates the graceful aging of the monitored system.

For purposes of updating the empirical SPRT distribution for a given sensor over a moving window of observations, it is preferable not to double-count the contribution to the distribution by a given residual data point. Therefore, residual data only from non-overlapping windows of observations should be used to augment the distribution.

According to yet another aspect of the invention, the operational ranges of the monitored system can be segregated into distinct states to which different empirical distributions would apply for each sensor. These distributions are necessarily derived using data from the respective operational states. One way for achieving this according to the invention can be employed when the operational state of the monitored system is readily detectable from a control parameter or other state indicator. For example, in a jet engine, the states of take-off and cruise can be distinguished be reference to altitude and air speed, or time from take-off roll. Such thresholds that distinguish states of operation are application-specific. Each sensor can have a different empirical distribution for its SPRT for each different state of operation of the monitored system. In certain circumstances, yet another alternative according to the invention is to employ a different empirical distribution for a sensor to different ranges of the value of that sensor, irrespective of the operation of the monitored system as a whole. This could be beneficial in the case where the response characteristics of the sensor are range-dependent.

A wide variety of models can be used in the invention to generate estimates of parameter data for the monitored system. One such modeling technique employs a reference library of parameter observations characteristic of normal operation, coupled to a similarity engine disposed to generate a set of estimates with reference to the reference library, in response to receiving a set of monitored data. The similarity engine carries out a series of mathematical operations against the current observation set of parameter values, which includes gauging a metric of the similarity of the observation set to each of the observations in the reference library, and generating an estimate of the parameters based on similarity. These are described below.

For a given set of contemporaneous sensor data from the monitored process or machine running in real-time, the estimates for the sensors can be generated according to:

$$\vec{Y}_{estimated} = \vec{D} \bullet \vec{W} \tag{12}$$

where the vector Y of estimated values for the sensors is equal to the contributions from each of the observations of contemporaneous sensor values arranged to comprise matrix D (the reference library). These contributions are determined by weight vector W. The multiplication operation is the standard matrix/vector multiplication operator. The vector Y has as many elements as there are sensors of interest in the monitored process or machine. W has as many elements as there are reference observations in D. W is determined by:

$$\vec{W} = \frac{\hat{\vec{W}}}{\left(\sum_{j=1}^{N} \hat{\vec{W}}(j)\right)} \quad (13)$$

$$\hat{\vec{W}} = \left(\overline{D}^T \otimes \overline{D}\right)^{-1} \cdot \left(\overline{D}^T \otimes \vec{Y}_{in}\right) \quad (14)$$

where the T superscript denotes transpose of the matrix, and $Y_{in}$ is the current observation of actual, real-time sensor data. The similarity operator of the similarity engine is symbolized in Equation 14, above, as the circle with the "X" disposed therein. Moreover, D is again the reference library as a matrix, and $D^T$ represents the standard transpose of that matrix (i.e., rows become columns). $Y_{in}$ is the real-time or actual sensor values from the underlying system, and therefore is a vector snapshot.

The similarity operator represented by the symbol $\otimes$ could potentially be chosen from a variety of operators. For purposes of the present invention the meaning of $\otimes$ is that of a "similarity" operation. The similarity operator, $\otimes$, works much as regular matrix multiplication operations, on a row-to-column basis. The similarity operation yields a scalar value for each pair of corresponding nth elements of a row and a column, and an overall similarity value for the comparison of the row to the column as a whole. This is performed over all row-to-column combinations for two matrices (as in the similarity operation on D and its transpose above).

By way of example, one similarity operator that can be used compares the two vectors (the $i^{th}$ row and $j^{th}$ column) on an element-by-element basis. Only corresponding elements are compared, e.g., element (i,m) with element (m,j) but not element (i,m) with element (n,j). For each such comparison, the similarity is equal to the absolute value of the smaller of the two values divided by the larger of the two values. Hence, if the values are identical, the similarity is equal to one, and if the values are grossly unequal, the similarity approaches zero. When all the elemental similarities are computed, the overall similarity of the two vectors is equal to the average of the elemental similarities. A different statistical combination of the elemental similarities can also be used in place of averaging, e.g., median.

One example of such an operator that can be used with the present invention returns a value between one (identical) and zero (dissimilar) provided by the minimum value divided by the maximum value, for two values. According to another similarity operator that can be used, an elemental similarity for like elements of two vectors is provided by:

$$s_c = \left(1 + \left(\frac{\theta_c^\lambda}{\rho}\right)\right)^{-1} \quad (15)$$

where $\theta_C$ (theta(c)) is a function of the elements A(c) and B(c) of vectors A and B respectively; $\lambda$ (lambda) and $\rho$ (rho) are sensitivity constants that can be selected for optimization. The function theta preferably returns a zero when the elements A(c) and B(c) are equal or identical, and preferably returns an increasingly large positive number with increasing difference of the two elements, with no limit. Lambda $\lambda$ and rho $\rho$ can be selected as any positive constants, and preferably are selected in the range of one to four. Theta can then be selected from a variety of functions according to the invention. Importantly, theta preferably scales the sameness or difference of two corresponding elements by the range observed over the reference library for the sensor corresponding to the two elements. By way of example, theta can be defined as follows:

$$\theta_c = \frac{\max(A_c, B_c) - \min(A_c, B_c)}{(Max_{range} - Min_{range})} \quad (16)$$

where:

$Max_{range}$ is the maximum value of the sensor corresponding to the cth element across all snapshots in the reference library D;

$Min_{range}$ is the minimum value of that sensor in the same manner;

$A_c$ represents the cth component of the snapshot A (typically the current live snapshot of the process or machine, but also can be a row or column from a matrix of snapshots);

$B_c$ represents the cth component of the snapshot B (typically a column of the reference library D, but can also be a vector or snapshot from any matrix of snapshots);

The elemental similarities are then averaged to provide a vector-to-vector similarity for purposes of equation 14 above.

Alternatively, certain similarity operators simply provide an overall scalar value upon comparison of two vectors or a row and a column. For example, one similarity operator that can work in this fashion is the Euclidean distance between the two vectors in n-space, where n is the number of sensors or parameters in each vector.

In general, the following guidelines help to define a similarity operator:

1. Similarity is a scalar range, bounded at each end.
2. The similarity of two identical inputs is the value of one of the bounded ends.
3. Preferably (but not necessarily) the similarity changes monotonically over the scalar range.
4. Preferably (but not necessarily) the absolute value of the similarity increases as the two inputs approach being identical.

Accordingly, for example, an effective similarity operator for use in the present invention can generate a similarity of ten (10) when the inputs are identical, and a similarity that diminishes toward zero as the inputs become more different. Alternatively, a bias or translation can be used, so that the similarity is 12 for identical inputs, and diminishes toward 2 as the inputs become more different. Further, a scaling can be used, so that the similarity is 100 for identical inputs, and diminishes toward zero with increasing difference. Moreover, the scaling factor can also be a negative number, so that the similarity for identical inputs is -100 and approaches zero from the negative side with increasing difference of the inputs. The similarity can be rendered for the elements of two vectors being compared, and summed or otherwise statistically combined to yield an overall vector-to-vector similarity, or the similarity operator can operate on the vectors themselves (as in Euclidean distance).

Generally, any number of similarity operators could be used in the similarity engine of this kind of model for purposes of the invention. Examples of such other operators are provided in, for example, Equations 8–17 of published international PCT application number PCT/US00/11488, publication number WO 00/67412, to Black, and are incorporated herein by reference. The recitation of the above operators is exemplary and not meant to limit the scope of the claimed invention.

The reference library for such models is empirical, and generated from data acquired for normal or targeted operation of the monitored system. One technique for populating the reference library with characteristic data selected from a larger set of such acquired data includes a given observation (i.e., set of contemporaneous sensor readings) if the observation contains a maximum or minimum value for any one sensor, as compared to all other available observations. As a result, the reference library has at most a set of observations numbering twice the count of sensors in the monitored system.

Accordingly, other kinds of models that can be used to provide estimates of the operational parameters of the monitored process include (a) models using neural networks to generate estimated values or states, and (b) models built from first principles, that is, sets of equations determined to govern the behavior of the measured parameters.

Another example of an empirical modeling method that can be used to produce estimates for purposes of the present invention is kernel regression, or kernel smoothing. A kernel regression can be used to generate an estimate based on a current observation in much the same way as the similarity-based model, which can then be used to generate a residual as detailed elsewhere herein. Accordingly, the following Nadaraya-Watson estimator can be used:

$$\hat{y}(\vec{X}, h) = \frac{\sum_{i=1}^{n} K_h(\vec{X} - \vec{X}_i) y_i}{\sum_{i=1}^{n} K_h(\vec{X} - \vec{X}_i)} \quad (17)$$

where in this case a single scalar inferred parameter y-hat is estimated as a sum of weighted exemplar yi from training data, where the weight it determined by a kernel K of width h acting on the difference between the current observation X and the exemplar observations Xi corresponding to the yi from training data. The independent variables Xi can be scalars or vectors. Alternatively, the estimate can be a vector, instead of a scalar:

$$\vec{Y}_{estimated}(\vec{X}, h) = \frac{\sum_{i=1}^{n} K_h(\vec{X} - \vec{X}_i) \vec{Y}_i}{\sum_{i=1}^{n} K_h(\vec{X} - \vec{X}_i)} \quad (18)$$

Here, the scalar kernel multiplies the vector Yi to yield the estimated vector.

A wide variety of kernels are known in the art and may be used. One well-known known kernel, by way of example, is the Epanechnikov kernel:

$$K_h(u) = \begin{cases} \frac{3}{4h}(1 - u^2/h^2); & |u| \le h \\ 0; & |u| > h \end{cases} \quad (19)$$

where h is the bandwidth of the kernel, a tuning parameter, and u can be obtained from the difference between the current observation and the exemplar observations as in equation 6. Another kernel of the countless kernels that can be used in remote monitoring according to the invention is the common Gaussian kernel:

$$K_h(\vec{X} - \vec{X}_i) = \frac{1}{\sqrt{2}} e^{-\frac{(\vec{X} - \vec{X}_i)^2}{2}} \quad (20)$$

It will be appreciated by those skilled in the art, that modifications to the foregoing preferred embodiments may be made in various aspects. Other variations clearly would also work, and are within the scope and spirit of the invention. The present invention is set forth with particularity in the appended claims. It is deemed that the spirit and scope of that invention encompasses such modifications and alterations to the preferred embodiment as would be apparent to one of ordinary skill in the art and familiar with the teachings of the present application.

What is claimed is:

1. An apparatus for monitoring operation of a system instrumented with sensors, comprising:
   a data acquisition front-end for receiving actual sensor signal values descriptive of the operation of the monitored system;
   an information processor for executing a computational model for generating sensor signal estimates in response to the actual sensor signal values from said data acquisition front-end;
   said information processor subtracting the sensor signal estimates generated with the computational model from the actual sensor signal values to provide residual values for the sensors on the monitored system;
   a memory for storing an empirically determined distribution of residual values determined from residuals corresponding to estimates from said computational model for normal operation of the system as a plurality of piecewise continuous functions; and
   said information processor further operable to perform a sequential probability ratio test on the residual values using the functions in said memory to indicate whether a sequence of observations represents residual values within the empirically determined distribution for normal operation.

2. An apparatus as recited wherein claim 1 wherein said memory stores piecewise continuous functions defining a histogram.

3. An apparatus as recited wherein claim 1 wherein said memory stores piecewise continuous functions defining a curve that is smooth in the first derivative.

4. An apparatus as recited wherein claim 3 wherein said memory stores piecewise continuous functions defining a curve that is smooth in the second derivative.

5. An apparatus as recited wherein claim 4 wherein said piecewise continuous functions comprise a cubic spline.

6. An apparatus as recited wherein claim 1 wherein said computational model uses a nonparametric regression to generate estimates.

7. An apparatus as recited in claim 6 wherein said computation model uses a kernel regression to generate estimates.

8. An apparatus as recited in claim 6 wherein said computation model uses a similarity operation to generate estimates.

9. A computer program product for detecting faults in a monitored system instrumented with sensors and having a plurality of operational modes, comprising:
   a modeling module for generating sensor estimates in response to successive observations of actual sensor values, and for generating residual values as the difference between actual sensor values and corresponding sensor estimates;
   a statistical testing module disposed to indicate a detected fault in the monitored system if a sequence of residual values for a sensor differs from an expected distribution of residual values for that sensor determined from residuals corresponding to estimates from said modeling module, associated with desired operation of said system;

a mode selection module for selecting an expected residual distribution for a sensor corresponding to a current operational mode of said system for use by said statistical testing module, from among a stored set of distributions.

10. A computer program product according to claim 9 wherein said mode selection module selects an expected residual distribution corresponding to a current operational mode of the system determined from the value of at least one of said actual sensor values.

11. A computer program product according to claim 9 further comprising a distribution determination module for generating and storing an expected residual distribution empirically from a sequence of residuals for a sensor for a given mode of operation of said system.

12. A computer program product according to claim 11 wherein said distribution determination module generates an expected residual distribution by generating a histogram of residuals for a sensor for a given mode of operation of said system.

13. A computer program product according to claim 11 wherein said distribution determination module generates an expected residual distribution by fitting a curve to a histogram of residuals.

14. A computer program product according to claim 13 wherein said distribution determination module fits a plurality of piecewise continuous curves to a histogram of residuals.

15. A computer program product according to claim 14 wherein said distribution determination module fits a histogram of residuals with a cubic spline.

16. A computer program product according to claim 9 wherein said modeling module employs a nonparametric regression to generate sensor estimates.

17. A computer program product according to claim 16 wherein said modeling module employs a kernel regression to generate sensor estimates.

18. A computer program product according to claim 16 wherein said modeling module employs a similarity operation to generate sensor estimates.

19. A method for monitoring a system instrumented with sensors, comprising the steps of:
    generating sensor estimates in response to successive observations of actual sensor values;
    generating residual values as the difference between actual sensor values and corresponding sensor estimates;
    statistically testing a sequence of residual values for a sensor to determine if they are representative of an expected distribution of residual values for that sensor associated with desired operation of said system; and
    updating the expected distribution according to a moving window of past observations of residual values for that sensor.

20. A method according to claim 19 further comprising the step of generating an alert if the step of statistically testing indicates the sequence of residual values is not representative of the expected distribution.

21. A method according to claim 20 wherein said updating step is performed only if the window of past observations has an occurrence of alerts less than a threshold.

22. A method according to claim 21 wherein the threshold is 5% of observations in the window.

23. A method according to claim 19 wherein said step of statistically testing comprises performing a sequential probability ratio test using the expected distribution.

24. A method according to claim 19 wherein said step of generating estimates comprises employing a nonparametric regression to estimate a sensor value.

25. A method according to claim 24 wherein said step of generating estimates comprises employing a kernel regression to estimate a sensor value.

26. A method according to claim 24 wherein said step of generating estimates comprises employing a similarity operation to estimate a sensor value.

27. A method according to claim 19 wherein said updating step comprises generating a histogram of residual values comprising residual values selected from the window of past observations.

28. A method according to claim 27 wherein said updating step further comprises fitting a curve to the histogram.

29. A method according to claim 28 wherein said updating step further comprises fitting a piecewise continuous set of functions to the histogram.

30. A method according to claim 29 wherein the fitted piecewise continuous set of functions is continuous in the first derivative.

31. A method according to claim 29 wherein the fitted piecewise continuous set of functions is continuous in the second derivative.

32. A method according to claim 29 wherein the fitted piecewise continuous set of functions is a cubic spline.

33. A method for monitoring operation of a system instrumented with sensors comprising:
    receiving actual sensor signal values descriptive of the operation of the monitored system;
    generating sensor signal estimates with a computational model in response to the actual sensor signal values from the receiving step;
    subtracting the sensor signal estimates generated with the computational model from the actual sensor signal values to provide residual values for the sensors on the monitored system;
    storing an empirically determined distribution of residual values determined from residuals corresponding to estimates from said computational model, for normal operation of the system as a plurality of piecewise continuous functions;
    statistically testing the residual signals with values using the functions in said memory to indicate whether a sequence of observations in time represent residual values within an expected distribution for normal operation; and
    selecting an empirically determined distribution of residual values from a plurality of modes in relation to a sensor corresponding to a current operational mode of the system for use by the statistically testing step from among a stored set of distributions.

34. A method as recited in claim 33 wherein the storing step comprises values of the piecewise continuous functions organized as a histogram normalized to provide an approximate distribution shape.

35. A method as recited in claim 33 wherein the storing step comprises values from the piecewise continuous functions defining a curve approximated for fitting an empirical distribution.

36. A method as recited in claim 35 wherein the piecewise continuous functions comprise fitting the defined curve with splining techniques.

37. A method as recited in claim 33 comprising updating the empirically determined distribution according to a moving window of past observations of residual values for respective sensors.

* * * * *